United States Patent [19]

Yamamoto

[11] 4,017,727
[45] Apr. 12, 1977

[54] LIGHT PROJECTING APPARATUS
[76] Inventor: David J. Yamamoto, 4420 W. Vogel, Glendale, Ariz. 85301
[22] Filed: Nov. 12, 1975
[21] Appl. No.: 631,106
[52] U.S. Cl. .................. 240/1.3; 240/92; 354/126
[51] Int. Cl.² .................. G03B 15/02
[58] Field of Search ........... 240/1.3, 92, 106 R; 354/126, 141, 145, 147, 149; 350/160 R, 162 R, 167, 211

[56] References Cited
UNITED STATES PATENTS

| 2,953,675 | 9/1960 | Kluge | 240/1.3 |
| 2,972,673 | 2/1961 | Graef | 240/1.3 |
| 3,404,612 | 10/1968 | Harvey | 354/149 X |
| 3,720,145 | 3/1973 | Johnson et al. | 354/147 |
| 3,747,488 | 7/1973 | Bennett | 354/126 |
| 3,878,385 | 4/1975 | Kingston | 354/126 X |

Primary Examiner—Richard A. Wintercorn
Attorney, Agent, or Firm—Herbert E. Haynes, Jr.

[57] ABSTRACT

An elongated bar having a clamping head thereon is demountably attached to a photo flash unit to position a fresnel lens in the light beam path of the flash unit to project the light beam for telephoto use.

7 Claims, 3 Drawing Figures

LIGHT PROJECTING APPARATUS

BACKGROUND OF THE INVENTION

1. Field of the Invention

This invention relates to artificial illumination for photography, and more particularly to the projection of a light beam for telephoto photography.

2. Background of the Invention

In general, devices for projecting a light beam for telephoto photography are bulky and complex units which are impractical in many instances for those reasons, and the cost of such devices is more than many photographers and hobbyists are willing to pay.

A particular prior art device has been developed to overcome the above described general problems and that prior art device includes a bar clamped intermediate its opposite ends on a telephoto lens with that bar equipped to carry a photo flash unit on one end and a fresnel lens on the other end. The mounting of this prior art device is time consuming and can result in the loss of valuable photographs. Also, the mounting of the device atop the telephoto lens is less than desirable as the weight thereof places an undesirable stress on the lens assembly and its positioning can interfere with the lens focusing mechanism. The only way to alter the projected light pattern in this prior art device is to exchange the fresnel lens thereof with one of a different size, as the distance between the photo flash mechanism and the fresnel lens is fixed.

Therefore, a need exists for a new and improved light projecting apparatus that overcomes some of the problems and shortcomings of the prior art.

SUMMARY OF THE INVENTION

In accordance with the present invention, a new and useful light projecting apparatus is disclosed for use in telephoto photography. The apparatus is designed primarily for use in conjunction with a photo flash unit of the type having a cylindrical body depending from the light emitting structure. Such a unit is sometimes referred to in the art as a potato masher, and is a rechargeable electronic flash unit. This type of electronic photo flash unit is most often demountably attached to the side of the camera by means of a quick disconnect clamp part of which is carried on the side of the camera with the other part being mounted on the cylindrical body of the flash unit.

In accordance with the present invention, a similar quick disconnect clamp is employed to demountably attach an elongated bar to the cylindrical body of the flash unit. The elongated bar extends from the cylindrical body below and substantially parallel with the light beam path produced by the flash unit, and the bar supportingly carries a clamping head thereon. The clamping head is adapted to demountably carry a fresnel lens and position that lens in the light beam path of the photo flash unit. The clamping head is slidably movable along the length of the elongated bar in predetermined increments so the light pattern projected by the apparatus of the present invention can be altered to suit the various requirements of the photography equipment and the subject being photographed.

Accordingly, it is an object of the present invention to provide a new and improved light projecting apparatus for use in telephoto photography.

Another object of the present invention is to provide a new and improved light projecting apparatus for use in telephoto photography which employs a fresnel lens positioned in the light beam path of a photo flash unit with the fresnel lens carried by an elongated bar demountably attached to the photo flash unit.

Another object of the present invention is to provide a new and improved light projecting apparatus which includes an elongated bar demountably coupled to a photo flash unit with a clamping head carried by the elongated bar and a fresnel lens carried by the clamping head and extending therefrom into the light beam path of the photo flash unit.

Still another object of the present invention is to provide a new and improved light projecting apparatus of the above described character having the clamping head slidably movable along the length of the elongated bar which positions the fresnel lens at various distances from the photo flash unit to alter the pattern of the light beam projected through the fresnel lens.

The foregoing and other objects of the present invention, the various features thereof as well as the invention itself may be more fully understood from the following description when read in conjunction with the accompanying drawings.

DESCRIPTION OF THE PREFERRED EMBODIMENT

Figure 1:
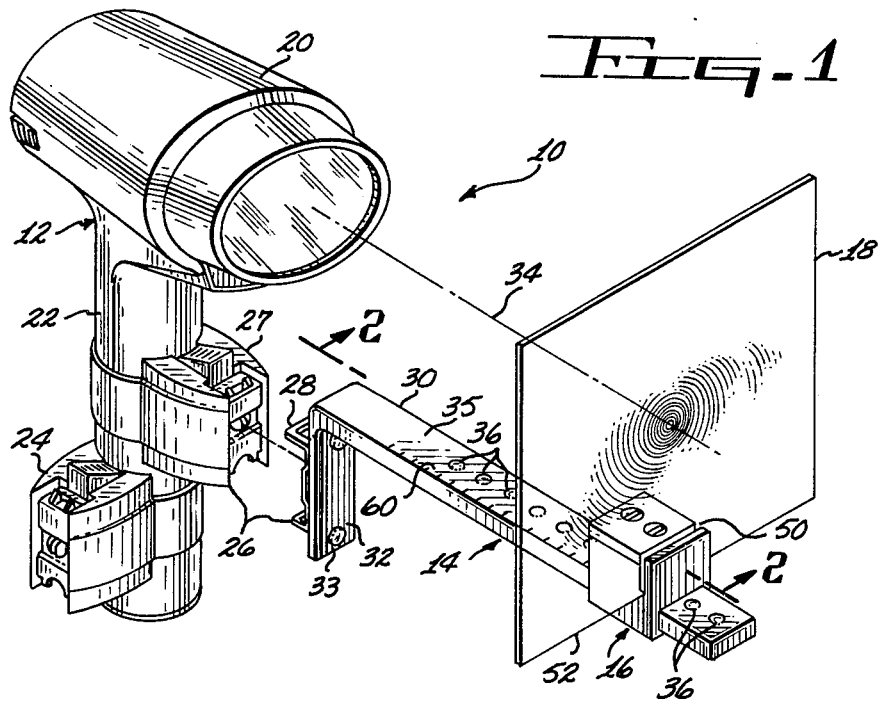
FIG. 1 is a partially exploded isometric view of the light projecting apparatus of the present invention illustrating the various features thereof.
Figure 2:
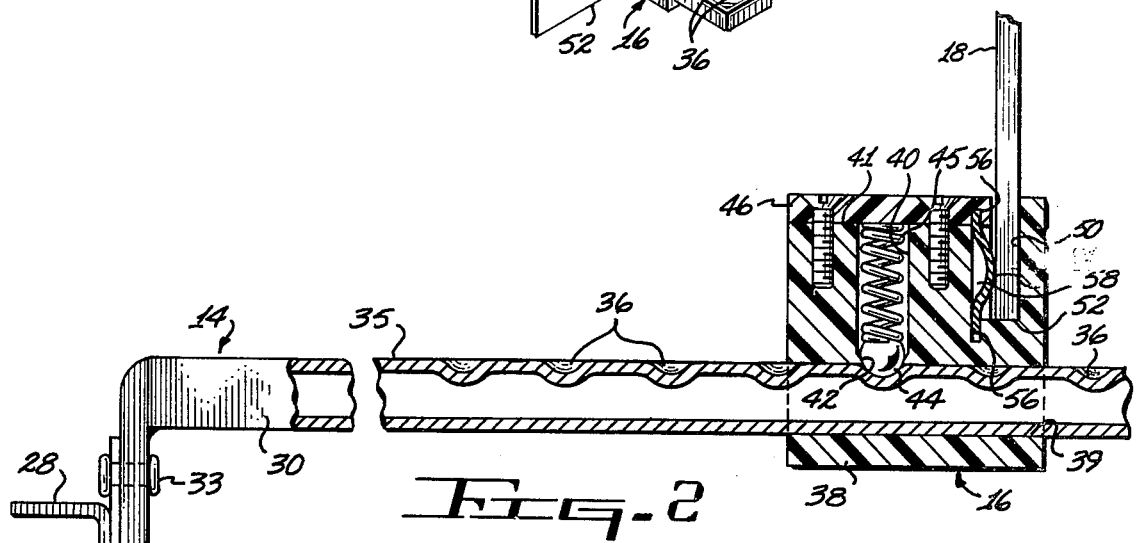
FIG. 2 is an enlarged fragmentary sectional view taken on the line 2—2 of FIG. 1.
Figure 3:
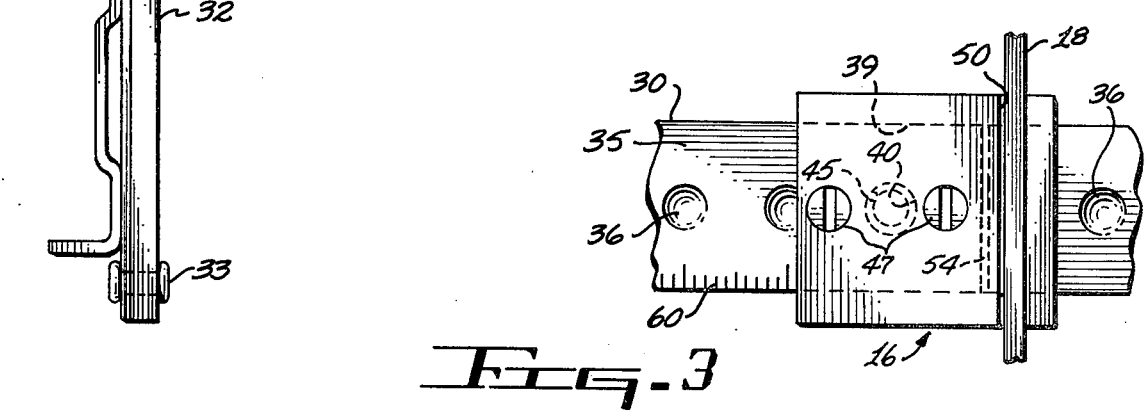
FIG. 3 is a plan view of a fragmentary portion of the apparatus of the present invention.

Referring more particularly to the drawings, FIG. 1 shows the light projecting apparatus of the present invention which is indicated generally by the reference numeral 10. The apparatus 10 includes a photo flash unit 12 having an elongated bar 14 demountably coupled thereto with the bar 14 carrying a clamping head 16 thereon in which a fresnel lens 18 is mounted.

The photo flash unit 12 is preferably of the type shown to have a light emitting structure 20 from which an elongated cylindrical body 22 depends. As is customary, such photo flash units are normally coupled to the side of a camera (not shown) and are electrically connected thereto so that a flash of light is produced by the flash unit in synchronism with camera shutter movement as is well known in the art. Coupling of the photo flash unit 12 to the side of the camera (not shown) is usually accomplished by a quick disconnect clamp a portion 24 of which is shown mounted on the elongated body 22 of the flash unit 12. Coupling of the elongated bar 14 to the photo flash unit 12 is similarly accomplished with a quick disconnect clamp 26 which, as shown in FIG. 1, includes the female member 27 thereof affixed to the elongated body 22 of the flash unit 12, and the male member 28 affixed to the elongated bar 14.

It should be noted that the photo flash unit 12 and the quick disconnect clamp 26 are well known in the art and the specific configurations shown are not to be construed as limitations to the apparatus of the present invention as such structures will differ from one manufacturer to another.

The elongated bar 14 includes an arm 30, which is preferably of tubular construction for optimum strength and weight, and a strap 32 depending from one end of the arm 30. The male member 28, or clip, of the quick disconnect clamp 26 is attached to the depending strap 32 such as with rivets 33. Thus, as seen in FIG. 1, the arm 30 extends perpendicularly from the cylindrical body 22 of the flash unit 12 when the elongated bar 14 is attached thereto, and is positioned below and parallel to the light beam path 34 producable by the flash unit. The upper surface 35 of the arm 30 is provided with a plurality of dimples 36 which are formed in spaced increments along the length of the arm for positioning of the clamping head 16 thereon as will hereinafter be described in detail.

The clamping head 16 is a generally block shaped housing 38 having a passage 39 extending therethrough. The passage 39 is configured to receive the arm 30 therein so that the housing 38 is slidably movable along the length of the arm 30. A cylindrical bore 40 is formed in the housing 38 so as to extend transversely between the passage 39 and the upper surface 41 of the housing, and the bore 40 is formed with a seat 42 at the end thereof which is adjacent the passage 39 of the housing. A ball 44 and spring 45 are assembled within the bore 40 of the housing 38 so that the ball is yieldingly biased into engagement with the seat 42 and will partially extend into the passage 39 of the housing 38. One end of the spring 45 bears against the ball 44 and the opposite end thereof is in engagement with a plate 46 that is affixed to the upper surface 41 of the housing 38, such as with screws 47.

Thus, it may now be seen that the spring loaded ball 44 and the plurality of dimples 36 formed in the arm 30 of the elongated bar 14 cooperate to form a detent means which positions the clamping head 16 at predetermined locations on the bar 14. Sliding movements of the clamping head 16 along the bar 14 will cause the ball 44 to move sequentially into and out of engagement with the dimples 36 and result in releasably holding the clamping head 16 at those predetermined positions of ball dimple engagement.

The clamping head 16 is also provided with an upwardly opening transverse slot 50 for receiving a portion of one edge 52 of the fresnel lens 18 so that the lens is held normal to the elongated bar 14 and extends from the clamping head 16 to intersect the light beam path 34 from the flash unit 12 so that the center of the lens substantially coincides with the light beam axis. The fresnel lens 18 is preferrably held in the transverse slot 50 of the clamping head 16 by a spring element 54 which allows the lens 18 to be quickly assembled to or removed from the clamping head. The spring element 54 is held on its opposite edges 56 by the housing 38 and the plate 46 within a cavity 58 formed in the housing laterally of the transverse slot 50. The spring element 54 is bowed between its opposite edges 56 to extend laterally from the cavity 58 into the slot 50. Therefore, when the fresnel lens 18 is inserted into the slot 50, the lens will deflect the spring element 54 toward the cavity 58 and frictional engagement of the lens 18 with the spring element 54 will result.

As is well known in the art, a fresnel lens is a flat sheet, usually of plastic, on which a series of concentric grooves are formed, and each groove is a minute refracting facet capable of bending light. The ability of a fresnel lens to pass light is substantially greater than that of a conventional lens of the same focal length. Fresnel lenses come in various sizes and can be obtained from several sources such as from the Edmund Scientific Co., 635 Edscorp Building, Barrington, N.J. 08007.

The light beam 34 produced by the flash unit 12, which is a relatively rapidly diffusing beam, impinges on the fresnel lens 18 and is refracted thereby into a concentrated beam that is projected substantially farther than would otherwise be possible. With the distance between the flash unit 12 and the fresnel lens 18 being adjustable, as hereinbefore, described, the projected light beam can be altered to provide the desired light pattern at various distances from the light projecting apparatus 10 of the present invention. If desired, a suitable scale 60 may be provided on the upper surface 41 of the arm 30 to aid in positioning of the clamping head 16 on the elongated bar 14.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A light projecting apparatus comprising:
   a. a photo flash unit having a light emitting structure from which an elongated body perpendicularly depends;
   b. an elongated bar one end of which is demountably attached to the elongated body of said photo flash unit, said elongated bar positioned below and extending substantially parallel with the light beam path producable by said photo flash unit;
   c. a clamping head carried on said elongated bar; and
   d. a fresnel lens demountably attached to said clamping head and extending therefrom into the light beam path producable by said photo flash unit to substantially coincide with the light beam axis.

2. A light projecting apparatus as claimed in claim 1 wherein said clamping head is slidably movable along the length of said elongated bar for altering the distance between the said fresnel lens and the light emitting structure of said photo flash unit.

3. A light projecting apparatus as claimed in claim 1 and further comprising:
   a. said clamping head slidably movable along the length of said elongated bar; and
   b. detent means in said clamping head and in said elongated bar for releasably holding said clamping head in at least two positions along the length of said elongated bar.

4. A light projecting apparatus as claimed in claim 3 wherein said detent means comprises:
   a. at least two dimples spacedly formed in said elongated bar; and
   b. a ball mounted in said clamping head, said ball yieldingly biased to move into and out of engagement with said dimples as said clamping head is slidably moved along said elongated bar.

5. A light projecting apparatus as claimed in claim 3 wherein said detent means comprises:
   a. a plurality of dimples formed in predetermined spaced increments along the length of said elongated bar; and b. a ball mounted in said clamping head and yieldingly biased to move sequentially into and out of engagement with each of said plurality of dimples when said clamping head is slidably moved along the length of said elongated bar.

6. A light projecting apparatus as claimed in claim 1 and further comprising:
   a. said clamping head having a transverse slot formed therein for receiving a portion of one edge of said fresnel lens; and
   b. means within the transverse slot of said clamping head for releasably holding the portion of the one edge of said fresnel lens.

7. A light projecting apparatus as claimed in claim 1 wherein said elongated bar is demountably attached to the elongated body of said photo flash unit by a quickly disconnectable clamp means a portion of which is mounted on said elongated bar and another portion of which is mounted on the elongated body of said photo flash unit.

* * * * *